US007538065B2

(12) United States Patent
McCarthy et al.

(10) Patent No.: US 7,538,065 B2
(45) Date of Patent: May 26, 2009

(54) NOBLE METAL-CONTAINING CATALYST CONTAINING A SPECIFIC RATIO OF SILICA TO ALUMINUM IN THE FRAMEWORK

(75) Inventors: Stephen J. McCarthy, Center Valley, PA (US); Wenyih F. Lai, Bridgewater, NJ (US); Sylvain S. Hantzer, Purcellville, VA (US); Ian A. Cody, Baton Rouge, LA (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 11/205,604

(22) Filed: Aug. 17, 2005

(65) Prior Publication Data

US 2006/0089254 A1   Apr. 27, 2006

Related U.S. Application Data

(60) Provisional application No. 60/607,802, filed on Sep. 8, 2004.

(51) Int. Cl.
*B01J 23/00* (2006.01)
*B01J 21/00* (2006.01)
*B01J 29/00* (2006.01)
*B01J 20/00* (2006.01)

(52) U.S. Cl. ............................ 502/258; 502/64; 502/66; 502/74; 502/87; 502/261; 502/262; 502/263; 502/326; 502/332; 502/334; 502/339; 502/355; 502/407; 502/415; 502/439

(58) Field of Classification Search .................... 502/64, 502/66, 74, 87, 258, 261, 262, 263, 326, 502/332, 333, 334, 339, 355, 407, 415, 439
See application file for complete search history.

(56) References Cited

U.S. PATENT DOCUMENTS

| | | | | |
|---|---|---|---|---|
| 5,366,945 | A * | 11/1994 | Kresge et al. | 502/60 |
| 5,475,178 | A * | 12/1995 | Del Rossi et al. | 585/455 |
| 5,573,657 | A * | 11/1996 | Degnan et al. | 208/144 |
| 5,837,639 | A * | 11/1998 | Kresge et al. | 502/64 |
| 7,151,073 | B2 * | 12/2006 | Lin et al. | 502/238 |
| 7,211,238 | B2 * | 5/2007 | Shan et al. | 423/625 |
| 7,268,195 | B2 * | 9/2007 | Lin et al. | 526/130 |
| 7,285,512 | B2 * | 10/2007 | Bai et al. | 502/66 |
| 2003/0113256 | A1 * | 6/2003 | Chantal | 423/651 |
| 2004/0138051 | A1 * | 7/2004 | Shan et al. | 502/60 |
| 2005/0159297 | A1 * | 7/2005 | Lin et al. | 502/62 |
| 2006/0247461 | A1 * | 11/2006 | Schlosberg et al. | 560/96 |
| 2006/0264318 | A1 * | 11/2006 | Shan et al. | 502/60 |

* cited by examiner

*Primary Examiner*—Cam N. Nguyen
(74) *Attorney, Agent, or Firm*—Robert A. Migliormi

(57) ABSTRACT

An improved noble metal-containing catalyst containing a specific ratio of silica to aluminum in the framework suitable for use in the hydroprocessing of hydrocarbonaceous feeds, which is directed at a catalyst comprising a hydrogenation-dehydrogenation component selected from the Group VIII noble metals and mixtures thereof on a mesoporous support having aluminum incorporated into its framework and an average pore diameter of about 15 to less than about 40 Å.

16 Claims, 1 Drawing Sheet

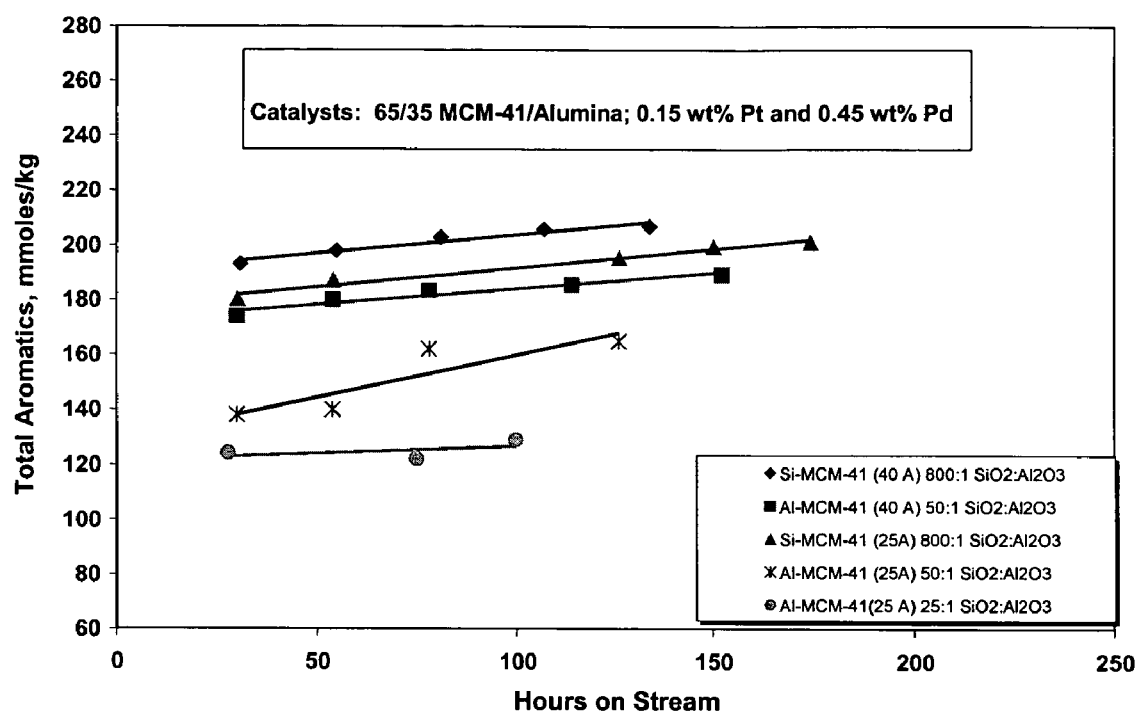
*FIGURE*

NOBLE METAL-CONTAINING CATALYST CONTAINING A SPECIFIC RATIO OF SILICA TO ALUMINUM IN THE FRAMEWORK

CROSS-REFERENCE TO RELATED APPLICATION

This application claims benefit of U.S. Provisional Patent Application Ser. No. 60/607,802 filed Sep. 8, 2004.

FIELD OF THE INVENTION

This invention relates to a noble metal-containing catalyst suitable for use in the hydroprocessing of hydrocarbonaceous feeds. More particularly, the present invention is directed at a catalyst comprising a hydrogenation-dehydrogenation component selected from the Group VIII noble metals and mixtures thereof on a mesoporous support having aluminum incorporated into its framework and an average pore diameter of about 15 to less than about 40 Å.

BACKGROUND OF THE INVENTION

Historically, lubricating oil products for use in applications such as automotive engine oils have used additives to improve specific properties of the basestocks used to prepare the finished products. With the advent of increased environmental concerns, the performance requirements for the basestocks themselves have increased. American Petroleum Institute (API) requirements for Group II basestocks include a saturates content of at least 90%, a sulfur content of 0.03 wt. % or less and a viscosity index (VI) between 80 and 120. Currently, there is a trend in the lube oil market to use Group II basestocks instead of Group I basestocks in order to meet the demand for higher quality basestocks that provide for increased fuel economy, reduced emissions, etc.

Conventional techniques for preparing basestocks such as hydrocracking or solvent extraction require severe operating conditions such as high pressure and temperature or high solvent:oil ratios and high extraction temperatures to reach these higher basestock qualities. Either alternative involves expensive operating conditions and low yields.

Hydrocracking has been combined with hydrotreating as a preliminary step. However, this combination also results in decreased yields of lubricating oils due to the conversion to distillates that typically accompany the hydrocracking process.

In U.S. Pat. No. 5,573,657, a hydrogenation catalyst, and process using the same, is described wherein a mineral oil based lubricant is passed over a mesoporous crystalline material, preferably with a support, containing a hydrogenation metal function. The supported mesoporous material has pore diameters greater than 200 Å. The hydrogenation process is operated such that the product produced therein has a low degree of unstaturation.

However, there is still a need in the art for an effective catalyst to prepare quality lubricating oil basestocks.

SUMMARY OF THE INVENTION

The present invention is directed at a catalyst that can be used in the hydroprocessing of a hydrocarbonaceous feed. The catalyst comprises:

a) an inorganic, porous, non-layered, crystalline, mesoporous support material, wherein the support material has a framework comprising at least aluminum and silica, and wherein the ratio of silica to aluminum is about 10:1 to about 100:1 and the average pore diameter of the support material is about 15 to less than about 40 Å; and b) a hydrogenation-dehydrogenation component selected from the Group VIII noble metals and mixtures thereof.

In one embodiment of the instant invention, the inorganic, porous, non-layered, crystalline, mesoporous support material is characterized as exhibiting an X-ray diffraction pattern with at least one peak at a d-spacing greater than 18 Å. The support material is further characterized as having a benzene absorption capacity greater than 15 grams benzene per 100 grams of the material at 50 torr (6.67 kPa) and 25° C.

In a preferred form, the support material is characterized by a substantially uniform hexagonal honeycomb microstructure with uniform pores having an average pore diameter of the support material is about 15 to less than about 35 Å.

In another preferred form, the present invention further comprises a binder material.

In yet another preferred form, the support material is MCM-41.

BRIEF DESCRIPTION OF THE FIGURE

The FIGURE is a graph depicting the aromatics saturation performance of catalysts with various pore sizes and aluminum concentrations in their framework versus the time the various catalysts were used in an aromatics saturation process.

DETAILED DESCRIPTION OF THE INVENTION

The present invention is a catalyst that is suitable for use in the hydroprocessing of lubricating oil feedstocks. The catalyst comprises an inorganic, porous, non-layered, crystalline, mesoporous support material preferably bound with a suitable binder material. The framework of the support material comprises at least aluminum and silica, and the support material is further characterized as having an average pore diameter of about 15 to less than about 40 Å. The catalyst also comprises a hydrogenation-dehydrogenation component selected from the Group VIII noble metals and mixtures thereof.

In their calcined form, support materials having characteristics similar to those suitable for use herein generally had a high ratio of silica to aluminum in their framework. Generally, these materials had a ratio of silica to aluminum in their framework on the order of about 800:1. The higher ratios of silica to aluminum were used to prevent undesirable cracking reactions. However, the inventors hereof have unexpectedly discovered that increasing the amount of aluminum incorporated into the framework, coupled with smaller pore sizes discussed below, provides a catalyst that has improved aromatics saturation capabilities.

Thus, support materials suitable for use in the in the present invention include synthetic compositions of matter comprising an ultra-large pore size crystalline phase. Suitable support materials are inorganic, porous, non-layered crystalline phase materials that are characterized (in its calcined form) by an X-ray diffraction pattern with at least one peak at a d-spacing greater than about 18 Å with a relative intensity of 100. The support materials suitable for use herein are also characterized as having a benzene sorption capacity greater than 15 grams of benzene per 100 grams of the material at 50 torr (6.67 kPa) and 25° C. Preferred support materials are inorganic, porous, non-layered material having a hexagonal arrangement of uniformly-sized pores with a maximum perpendicular cross-section pore dimension of about 15 to less than about 40 Å. A more preferred support material is identified as MCM-41. MCM-41 has a characteristic structure of hexagonally-arranged, uniformly-sized pores of at least 13 Å diameter, exhibits a hexagonal electron diffraction pattern that can be indexed with a $d_{100}$ value greater than about 18 Å, which corresponds to at least one peak in the X-ray diffraction pattern. MCM-41 is described in U.S. Pat. Nos. 5,098,684 and 5,573,657, which are hereby incorporated by reference, and also, to a lesser degree, below.

The inorganic, non-layered mesoporous crystalline support materials used as components in the present invention have a composition according to the formula $M_{n/q}(W_a X_b Y_c Z_d O_h)$. In this formula, W is a divalent element, selected from divalent first row transition metal, preferably manganese, cobalt, iron, and/or magnesium, more preferably cobalt. X is a trivalent element, preferably aluminum, boron, iron and/or gallium, more preferably aluminum. Y is a tetravalent element such as silicon and/or germanium, preferably silicon. Z is a pentavalent element, such as phosphorus. M is one or more ions, such as, for example, ammonium, Group IA, IIA and VIIB ions, usually hydrogen, sodium and/or fluoride ions. "n" is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1. In a preferred embodiment of support materials suitable for use herein, (a+b+c) is greater than d, and h=2. Another further embodiment is when a and d=0, and h=2. Preferred materials for use in making the support materials suitable for use herein are the aluminosilicates although other metallosilicates may also be used.

As stated above, the support materials suitable for use herein have a higher concentration of aluminum incorporated into their framework then those used prior to the present invention. Thus, support materials suitable for use herein have a framework silica to aluminum ratio of about 10:1 to about 100:1, preferably about 25:1 to about 70:1, more preferably about 30:1 to about 60:1, and most preferably about 45:1 to about 55:1.

In the as-synthesized form, the support materials suitable for use herein have a composition, on an anhydrous basis, expressed empirically by the formula $rRM_{n/q}(W_a X_b Y_c Z_d O_h)$, where R is the total organic material not included in M as an ion, and r is the coefficient for R, i.e., the number of moles or mole fraction of R. The M and R components are associated with the material as a result of their presence during crystallization, and are easily removed or, in the case of M, replaced by post-crystallization methods described below. To the extent desired, the original M, e.g., sodium or chloride, ions of the as-synthesized material of this invention can be replaced in accordance with conventional ion-exchange techniques. Preferred replacing ions include metal ions, hydrogen ions, hydrogen precursor, e.g., ammonium, ions and mixtures of these ions. Particularly preferred ions are those which provide the desired metal functionality in the final catalyst. These include hydrogen, rare earth metals and metals of Groups VIIA (e.g., Mn), VIIIA (e.g., Ni), IB (e.g., Cu), IVB (e.g., Sn) of the Periodic Table of the Elements and mixtures of these ions.

The crystalline (i.e., having sufficient order to provide a diffraction pattern such as, for example, by X-ray, electron or neutron diffraction, following calcination with at least one peak) mesoporous support materials are characterized by their structure, which includes extremely large pore windows as well as by its high sorption capacity. The term "mesoporous", as used herein, is meant to indicate crystals having uniform pores within the range of from about 13 Å to about 200 Å. It should be noted that "porous", as used herein, is meant to refer to a material that adsorbs at least 1 gram of a small molecule, such as Ar, $N_2$, n-hexane or cyclohexane, per 100 grams of the porous material. As stated above, the present invention is characterized as using a support material having an average pore diameter of about 15 to less than about 40 Å, preferably about 15 to about 35 Å, more preferably about 20 to about 30 Å, most preferably about 23 to about 27 Å. The pore size of the present invention is one key feature of the instant invention because the inventors hereof have unexpectedly found that by limiting the average pore diameter of the present invention to within this range, the aromatics saturation performance of the instant invention is greatly improved.

The support materials suitable for use herein can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. Thus, support materials for use herein can also be described as having a hexagonal arrangement of large open channels that can be synthesized with open internal diameters from about 15 to less than about 40 Å, preferably about 15 to about 35 Å, more preferably about 20 to about 30 Å, and most preferably about 23 to about 27 Å.

The term "hexagonal", as used herein, is intended to encompass not only materials that exhibit mathematically perfect hexagonal symmetry within the limits of experimental measurement, but also those with significant observable deviations from that ideal state. Thus, "hexagonal" as used to describe the support materials suitable for use herein is meant to refer to the fact that most channels in the material would be surrounded by six nearest neighbor channels at roughly the same distance. It should be noted, however, that defects and imperfections in the support material will cause significant numbers of channels to violate this criterion to varying degrees, depending on the quality of the material's preparation. Samples which exhibit as much as ±25% random deviation from the average repeat distance between adjacent channels still clearly give recognizable images of the MCM-41 materials. Comparable variations are also observed in the $d_{100}$ values from the electron diffraction patterns.

The support materials suitable for use herein can be prepared by any means known in the art, and are generally formed by the methods described in U.S. Pat. Nos. 5,098,684 and 5,573,657, which have already been incorporated by reference. Generally, the most regular preparations of the support material give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of suitable support materials show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance $a_0$ between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the suitable support material. The most highly ordered preparations of the suitable support material obtained so far have 20-40 distinct spots observable in the electron diffraction patterns. These patterns can be indexed with the hexagonal hkO subset of unique reflections of 100, 110, 200, 210, etc., and their symmetry-related reflections.

In its calcined form, support materials suitable for use herein may also be characterized by an X-ray diffraction pattern with at least one peak at a position greater than about 18 Å d-spacing (4.909° 2θ for Cu K-alpha radiation) which corresponds to the $d_{100}$ value of the electron diffraction pattern of the support material. Also, as stated above, suitable support materials display an equilibrium benzene adsorption capacity of greater than about 15 grams benzene/100 grams crystal at 50 torr (6.67 kPa) and 25° C. (basis: crystal material having been treated in an attempt to insure no pore blockage by incidental contaminants, if necessary).

It should be noted that the equilibrium benzene adsorption capacity characteristic of suitable support materials is measured on the basis of no pore blockage by incidental contaminants. For example, the sorption test will be conducted on the crystalline material phase having no pore blockage contaminants and water removed by ordinary methods. Water may be removed by dehydration techniques, e.g., thermal treatment. Pore blocking inorganic amorphous materials, e.g., silica, and organics may be removed by contact with acid or base or other chemical agents such that the detrital material will be removed without detrimental effect on the crystal.

In a more preferred embodiment, the calcined, crystalline, non-layered support materials suitable for use herein can be characterized by an X-ray diffraction pattern with at least two peaks at positions greater than about 10 Å d-spacing (8.842° 2θ for Cu K-alpha radiation) which corresponds to the $d_{100}$ value of the electron diffraction pattern of the support material, at least one of which is at a position greater than about 18 Å d-spacing, and no peaks at positions less than about 10 Å d-spacing with relative intensity greater than about 20% of the strongest peak. Still most preferred, the X-ray diffraction pattern of the calcined material of this invention will have no peaks at positions less than about 10 Å d-spacing with relative intensity greater than about 10% of the strongest peak. In any event, at least one peak in the X-ray diffraction pattern will have a d-spacing that corresponds to the $d_{100}$ value of the electron diffraction pattern of the material.

The calcined, inorganic, non-layered, crystalline support materials suitable for use herein can also be characterized as having a pore size of about 15 to less than about 40 Å or greater as measured by physisorption measurements. It should be noted that pore size, as used herein, is to be considered a maximum perpendicular cross-section pore dimension of the crystal.

As stated above, the support materials suitable for use herein can be prepared by any means known in the art, and are generally formed by the methods described in U.S. Pat. Nos. 5,098,684 and 5,573,657, which have already been incorporated by reference. The methods of measuring x-ray diffraction data, equilibrium benzene absorption, and converting materials from ammonium to hydrogen form is known in the art and can also be reviewed in U.S. Pat. No. 5,573,657, which has already been incorporated by reference.

The support materials suitable for use herein can be shaped into a wide variety of particle sizes. Generally speaking, the support material particles can be in the form of a powder, a granule, or a molded product, such as an extrudate having particle size sufficient to pass through a 2 mesh (Tyler) screen and be retained on a 400 mesh (Tyler) screen. In cases where the final catalyst is to be molded, such as by extrusion, the support material particles can be extruded before drying or partially dried and then extruded.

The size of the pores in the present support materials are controlled such that they are large enough that the spatiospecific selectivity with respect to transition state species in reactions such as cracking is minimized (Chen et al., "Shape Selective Catalysis in Industrial Applications", 36 CHEMICAL INDUSTRIES, pgs. 41-61 (1989), to which reference is made for a discussion of the factors affecting shape selectivity). It should also be noted that diffusional limitations are also minimized as a result of the very large pores.

Support materials suitable for use herein can be self-bound, i.e., binderless. However, it is preferred that the present invention also comprises a suitable binder material. This binder material is selected from any binder material known that is resistant to temperatures and other conditions employed in processes using the present invention. The support materials are composited with the binder material to form a finished catalyst onto which metals can be added. Binder materials suitable for use herein include active and inactive materials and synthetic or naturally occurring zeolites as well as inorganic materials such as clays and/or oxides such as alumina, silica or silica-alumina. Silica-alumina, alumina and zeolites are preferred binder materials, and alumina is a more binder support material. Silica-alumina may be either naturally occurring or in the form of gelatinous precipitates or gels including mixtures of silica and metal oxides. It should be noted that the inventors herewith recognize that the use of a material in conjunction with a zeolite binder material, i.e., combined therewith or present during its synthesis, which itself is catalytically active may change the conversion and/or selectivity of the finished. The inventors herewith likewise recognize that inactive materials can suitably serve as diluents to control the amount of conversion if the present invention is employed in alkylation processes so that alkylation products can be obtained economically and orderly without employing other means for controlling the rate of reaction. These inactive materials may be incorporated into naturally occurring clays, e.g., bentonite and kaolin, to improve the crush strength of the catalyst under commercial operating conditions and function as binders or matrices for the catalyst.

The present invention typically comprises, in a composited form, a ratio of support material to binder material ranging from about 80 parts support material to 20 parts binder material to 20 parts support material to 80 parts binder material, all ratios being by weight, typically from 80:20 to 50:50 support material:binder material, preferably from 65:35 to 35:65. Compositing may be done by conventional means including mulling the materials together followed by extrusion of pelletizing into the desired finished catalyst particles.

As stated above, the present invention further comprises a hydrogenation-dehydrogenation component selected from Group VIII noble metals and mixtures thereof. It is preferred that the hydrogenation-dehydrogenation component be selected from palladium, platinum, rhodium, iridium, and mixtures thereof, more preferably platinum, palladium, and mixtures thereof. It is most preferred that the hydrogenation-dehydrogenation component be platinum and palladium.

The hydrogenation-dehydrogenation component is typically present in an amount ranging from about 0.1 to about 2.0 wt. %, preferably from about 0.2 to about 1.8 wt. %, more preferably 0.3 to about 1.6 wt. %, and most preferably 0.4 to about 1.4 wt. %. All metals weight percents are on support. By "on support" we mean that the percents are based on the weight of the support, i.e., the composited support material and binder material. For example, if the support were to weigh 100 grams then 20 wt. % hydrogenation-dehydrogenation component would mean that 20 grams of the hydrogenation-dehydrogenation metal was on the support.

The hydrogenation-dehydrogenation component can be exchanged onto the support material, impregnated into it or physically admixed with it. It is preferred that the hydrogenation/dehydrogenation component be incorporated by impregnation. If the hydrogenation-dehydrogenation component is to be impregnated into or exchanged onto the composited support material and binder, it may be done, for example, by treating the composite with a suitable ion containing the hydrogenation-dehydrogenation component. If the hydrogenation-dehydrogenation component is platinum, suitable platinum compounds include chloroplatinic acid, platinous chloride and various compounds containing the platinum amine complex. The hydrogenation-dehydrogenation component may also be incorporated into, onto, or with the composited support and binder material by utilizing a compound(s) wherein the hydrogenation-dehydrogenation component is present in the cation of the compound and/or compounds or in which it is present in the anion of the compound(s). It should be noted that both cationic and anionic compounds can be used. Non-limiting examples of suitable palladium or platinum compounds in which the metal is in the form of a cation or cationic complex are $Pd(NH_3)_4Cl_2$ or $Pt(NH_3)_4Cl_2$ are particularly useful, as are anionic complexes such as the vanadate and metatungstate ions. Cationic forms of other metals are also very useful since they may be exchanged onto the crystalline material or impregnated into it.

The above description is directed to preferred embodiments of the present invention. Those skilled in the art will recognize that other embodiments that are equally effective could be devised for carrying out the spirit of this invention.

The following example will illustrate the improved effectiveness of the present invention, but is not meant to limit the present invention in any fashion.

EXAMPLE

A series of catalysts were made using MCM-41 mesoporous materials with different $SiO_2:Al_2O_3$ ratios and nominal pore sizes. Basically, MCM-41 mesoporous materials were synthesized with $SiO_2:Al_2O_3$ ratios between 800:1 and 25:1 with nominal pore sizes of 40 and 25 Angstroms. The synthesized MCM-41 materials were washed, filtered, and dried at 250° F. (121° C.) to prepare a dry cake. The dry cake was precalcined in nitrogen at about 540° C. The precalcined MCM-41 materials were then mixed with Versal-300 alumina binder and extruded into 1/16-inch (1.6 mm) cylinders. The extrudates were dried and then calcined in air at about 538° C. The calcined extrudates were then co-impregnated with 0.15 wt. % platinum and 0.45 wt. % palladium and dried at 120° C. The catalysts then received a final calcination in air at 304° C. to decompose the platinum and palladium compounds. Properties of the finished catalysts are summarized in the Table below. Note that benzene hydrogenation activity index increases with reduction in $SiO_2:Al_2O_3$ ratio or increase in the aluminum content of the MCM-41.

The Benzene Hydrogenation Activity ("BHA") test is a measure of the activity of the catalyst, and the higher the BHA index, the more active the catalyst. Thus, the performance of each catalyst was screened for hydrogenation activity using the BHA test. The BHA test was performed on each catalyst sample by drying 0.2 grams of the catalyst in helium for one hour at 100° C., then reducing the sample at a selected temperature (120° C. to 350° C., nominally 250° C.) for one hour in flowing hydrogen. The catalyst was then cooled to 50° C. in hydrogen, and the rate of benzene hydrogenation measured at 50° C., 75° C., 100° C., and 125° C. In the BHA test, hydrogen is flowed at 200 sccm and passed through a benzene sparger held at 10° C. The data are fit to a zero-order Arrhenius plot, and the rate constant in moles of product per mole of metal per hour at 100° C. is reported. It should be noted that Pt, Pd, Ni, Au, Pt/Sn, and coked and regenerated versions of these catalysts can be tested also. The pressure used during the BHA test is atmospheric. The results of the BHA test were recorded, and are included in the Table below.

TABLE

| MCM-41 $SiO_2:Al_2O_3$ | Pt (wt. %) | Pd (wt. %) | Surface Area ($m^2/g$) | Benzene Hydrogenation Activity Index | Oxygen Chemisorption (O/M) |
|---|---|---|---|---|---|
| 40 Angstrom Pore | | | | | |
| 800:1 | 0.14 | 0.44 | 589.00 | 120 | 0.55 |
| 50:1 | 0.13 | 0.45 | 448.00 | 200 | 0.53 |
| 25 Angstrom Pore | | | | | |
| 800:1 | 0.13 | 0.43 | 555.00 | 190 | 0.6 |
| 50:1 | 0.14 | 0.42 | 599.00 | 240 | 0.66 |
| 25:1 | 0.14 | 0.40 | 584.00 | 290 | 0.64 |

After each catalyst was prepared, the performance of each catalyst was separately evaluated for hydrofinishing a hydrotreated 600 N dewaxed oil. The dewaxed oil was first hydrotreated to reduce the sulfur content to about 200 wppm. The 600N dewaxed oil had an aromatics concentration of about 415 mmol/kg. Approximately 5 cc of each catalyst was separately loaded into an upflow micro-reactor. About 3 cc of 80-120 mesh sand was added to the catalyst loading to ensure uniform liquid flow. After pressure testing with nitrogen and hydrogen, the catalysts were dried in nitrogen at 260° C. for about 3 hours, cooled to room temperature, activated in hydrogen at about 260° C. for 8 hours and then cooled to 150° C. The 600N dewaxed oil feed was then introduced and operating conditions were adjusted to 2 LHSV, 1000 psig (6996 kPa), and 2500 scf $H_2$/bbl (445 $m^3/m^3$). Reactor temperature was increased to 275° C. and then held constant for about 7 to 10 days. Hydrogen purity was 100% and no gas recycle was used.

Product quality as defined by aromatics, sulfur, hydrogen, and nitrogen contents was monitored daily. Aromatics were measured by UV absorption (mmoles/kg). Total aromatics as a function of time on stream are shown in the FIGURE herein for the catalysts made using MCM-41 with different silica:alumina ratios and pore sizes. As can be seen in the FIGURE herein, the inventors hereof have unexpectedly found that catalysts made using MCM-41 with the lower silica:alumina ratio, i.e., higher acidity, and smaller diameter pore openings provided the highest level of aromatic saturation.

The invention claimed is:

1. A hydroprocessing catalyst comprising: a) an inorganic, porous, non-layered, crystalline, mesoporous support material, wherein the support material has a framework comprising at least alumina and silica, and wherein the ratio of silica to alumina is about 25:1 to about 70:1 and the average pore diameter of the support material is about 23 to less than about 27 Å and b) a hydrogenation-dehydrogenation component selected from Group VIII noble metals and mixtures thereof.

2. The catalyst according to claim 1 wherein said catalyst further comprises a binder material selected from active and inactive materials, synthetic zeolites, naturally occurring zeolites, inorganic materials, clays, alumina, and silica-alumina.

3. The catalyst according to claim 2 wherein said support material is composited with said binder material.

4. The catalyst according to claim 3 wherein said binder material is selected from the group consisting of silica-alumina, alumina and zeolites.

5. The catalyst according to claim 4 wherein said support material is MCM-41.

6. The catalyst according to claim 5 wherein the hydrogenation-dehydrogenation component is a mixture of platinum and palladium.

7. The catalyst according to claim 4 wherein the ratio of silica to aluminum in the framework of said support material about 30:1 to about 60:1.

8. The catalyst according to claim 2 wherein the support material displays an equilibrium benzene adsorption capacity of greater than about 15 grams benzene/100 grams crystal at 50 torr (6.67 kPa) and 25° C.

9. The catalyst according to claim 2 wherein the support material and the binder material are composited in a ratio of support material to binder material ranging from about 80 parts support material to 20 parts binder material to 20 parts support material to 80 parts binder material, all ratios being by weight.

10. The catalyst according to claim 2 wherein the support material and the binder material are composited in a ratio of support material to binder material ranging from 80:20 to 50:50 support material:binder material, based on weight.

11. The catalyst according to claim 1 wherein the support material has an X-ray diffraction pattern with at least two peaks at positions greater than about 10 Å d-spacing (8.842°2θ for Cu K-alpha radiation) which corresponds to the $d_{100}$ value of the electron diffraction pattern of the support material, at least one of which is at a position greater than about 18 Å d-spacing, and no peaks at positions less than about 10 Å d-spacing with relative intensity greater than about 20% of the strongest peak.

12. The catalyst according to claim 11 wherein the support material has an X-ray diffraction pattern with at least one peak at a position greater than about 18 Å d-spacing (4.909°2θ for Cu K-alpha radiation) which corresponds to the d100 value of the electron diffraction pattern of the support material and with no peaks at positions less than about 10 Å d-spacing with relative intensity greater than about 10% of the strongest peak.

13. The catalyst according to claim 1 wherein said hydrogenation-dehydrogenation component is present in an amount ranging from about 0.1 to about 2.0 wt. %.

14. The catalyst according to claim 13 wherein said hydrogenation-dehydrogenation component is selected from the group consisting of palladium, platinum, rhodium, iridium, and mixtures thereof.

15. The catalyst according to claim 14 wherein said hydrogenation-dehydrogenation component is selected from the group consisting of platinum, palladium, and mixtures thereof.

16. The catalyst according to claim 1 wherein said hydrogenauion-dehydrogenation component is present in an amount ranging from about 0.3 to about 1.6 wt. %.

* * * * *